(12) United States Patent
Kurz

(10) Patent No.: US 10,798,612 B2
(45) Date of Patent: Oct. 6, 2020

(54) DYNAMIC LOAD BALANCING USING DIFFERENT DATA TRANSMISSION PATHS IN A TELECOMMUNICATIONS NETWORK COMPRISING A MOBILE NETWORK PART, A FIXED NETWORK PART, AND A PLURALITY OF ROUTER DEVICES

(71) Applicant: Deutsche Telekom AG, Bonn (DE)

(72) Inventor: Michael Kurz, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 58 days.

(21) Appl. No.: 15/619,576

(22) Filed: Jun. 12, 2017

(65) Prior Publication Data

US 2017/0359755 A1  Dec. 14, 2017

(30) Foreign Application Priority Data

Jun. 14, 2016  (EP) .................................. 16174411

(51) Int. Cl.
| | |
|---|---|
| *H04W 28/10* | (2009.01) |
| *H04L 12/54* | (2013.01) |
| *H04W 40/12* | (2009.01) |
| *H04W 48/16* | (2009.01) |
| *H04W 84/12* | (2009.01) |
| *H04L 12/707* | (2013.01) |

(52) U.S. Cl.
CPC ......... *H04W 28/10* (2013.01); *H04L 12/5692* (2013.01); *H04W 40/12* (2013.01); *H04W 48/16* (2013.01); *H04W 84/12* (2013.01); *H04L 45/24* (2013.01)

(58) Field of Classification Search
CPC .... H04W 40/12; H04W 28/10; H04L 12/5692
See application file for complete search history.

(56) References Cited

U.S. PATENT DOCUMENTS

| | | | | |
|---|---|---|---|---|
| 2011/0188452 | A1* | 8/2011 | Borleske | G01D 4/004 370/328 |
| 2012/0147740 | A1* | 6/2012 | Nakash | H04L 12/437 370/221 |
| 2015/0365158 | A1 | 12/2015 | Kindler | |

OTHER PUBLICATIONS

Deepti Nandiraju et al: "Achieving Load Balancing in Wireless Mesh Networks Through Multiple Gateways", Mobile Adhoc and Sensor Systems (MASS), 2006 IEEE International Conference on, PI, Oct. 2, 2006 (Oct. 2, 2018), pp. 807-812, XP031003931.

(Continued)

*Primary Examiner* — Zhensheng Zhang
(74) *Attorney, Agent, or Firm* — Leydig, Voit & Mayer, Ltd.

(57) ABSTRACT

A method for dynamic load balancing using different data transmission paths in a telecommunications network includes: in a first step, communication data are exchanged between a fixed network part and a first router device using a first, wireline interface as the data transmission path; and in a second step, further communication data are exchanged using an alternative data transmission path, either in addition to using the data transmission path or instead of using the data transmission path, between the fixed network part and the first router device—via the second router device.

7 Claims, 2 Drawing Sheets

(56) References Cited

OTHER PUBLICATIONS

Leymann C Heidemann Deutsche Telekom AG M Wesserman Painless Security L Xue D Zhang Huawei N: §Hybrid Access Network Architecture; draft-lhwxz-hybrid-access-network-architecture-01.txt, Hybrid Access Network Architecture; Draft-LHWXZ-Hybrid-Access-Network-Architecture-01.txt, Internet Engineering Task Force, IETF; Standardworkingdraft, Internet Society (ISOC) 4, Rue Des Falaises CH-1205 Geneva, Switzerland, Oct. 27, 2014 (Oct. 27, 2014), pp. 1-15, XP015102795.
N Leymann et al: "Hybrid Access Network (Bonding Two or More Accesses)", Nov. 9, 2014 (Nov. 9, 2014), XP055293919.

* cited by examiner

DYNAMIC LOAD BALANCING USING DIFFERENT DATA TRANSMISSION PATHS IN A TELECOMMUNICATIONS NETWORK COMPRISING A MOBILE NETWORK PART, A FIXED NETWORK PART, AND A PLURALITY OF ROUTER DEVICES

CROSS-REFERENCE TO PRIOR APPLICATIONS

Priority is claimed to European Patent Application No. EP 16174411.5, filed on Jun. 14, 2016, the entire disclosure of which is hereby incorporated by reference herein.

FIELD

The present invention relates inter alia to a method for dynamic load balancing using different data transmission paths in a telecommunications network comprising a mobile network part and a fixed network part, and comprising at least one mobile device, wherein the telecommunications network comprises a plurality of router devices, the plurality of router devices comprising at least a first router device and a second router device, wherein the first router device comprises at least a first, wireline, interface with the fixed network part and at least a second, wireless, interface.

Furthermore, the present invention relates to a system for dynamic load balancing in a telecommunications network using different data transmission paths, wherein the telecommunications network comprises a mobile network part and a fixed network part, wherein the system comprises the telecommunications network and at least one mobile device, wherein the telecommunications network comprises a plurality of router devices, the plurality of router devices comprising at least a first router device and a second router device, wherein the first router device comprises at least a first, wireline, interface with the fixed network part and at least a second, wireless, interface.

Additionally, the present invention relates to a router device for dynamic load balancing in a telecommunications network using different data transmission paths, wherein the telecommunications network comprises a mobile network part and a fixed network part, and at least one mobile device, wherein the telecommunications network comprises, besides the router device as a first router device, a second router device, wherein the first router device comprises at least a first, wireline, interface with the fixed network part and at least a second, wireless, interface.

Furthermore, the present invention relates to a program and to a computer program product for dynamic load balancing using different data transmission paths in a telecommunications network comprising a mobile network part and a fixed network part.

BACKGROUND

Router devices, such as customer premises equipments, e.g. connected to a fixed line telecommunications network (i.e. comprising at least one wireline interface), are increasingly also equipped with at least one wireless interface, especially a Wi-Fi or WLAN (wireless local area network) interface. Especially in case of the wireless interface being a Wi-Fi or WLAN interface, such wireless interfaces are typically used to locally connect devices such as mobile phones, tablets, television sets or the like. In case of the router devices also being enabled of using a different kind of wireless interface, such as 3GPP (3rd Generation Partnership Project) mobile interface or LTE (Long Term Evolution) interface, such wireless interfaces are typically used to connect the router device to a mobile communication network.

SUMMARY

In an exemplary embodiment, the present invention provides a method for dynamic load balancing using different data transmission paths in a telecommunications network comprising a mobile network part and a fixed network part, and comprising at least one mobile device. The telecommunications network comprises a plurality of router devices, the plurality of router devices comprising at least a first router device and a second router device, wherein the first router device comprises at least a first, wireline interface with the fixed network part and at least a second, wireless interface, wherein the second router device comprises at least a third, wireline interface with the fixed network part and at least one wireless interface, wherein the first router device and the second router device are able to be connected using the second, wireless interface as well as the at least one wireless interface of the second router device. The at least one wireless interface of the second router device corresponds—either to the second, wireless interface—constituting an alternative data transmission path compared to the first router device using the first, wireline interface as data transmission path with the fixed network part—or to a fourth, wireless interface, the fourth, wireless interface connecting the first and second router devices via corresponding wireless interfaces of the mobile device—and likewise constituting an alternative data transmission path compared to the first router device using the first, wireline interface as data transmission path with the fixed network part. The method comprises the following steps: in a first step, communication data are exchanged between the fixed network part and the first router device using the first, wireline interface as the data transmission path; and in a second step, further communication data are exchanged using the alternative data transmission path, either in addition to using the data transmission path or instead of using the data transmission path, between the fixed network part and the first router device—via the second router device—using—either the third, wireline interface and the second, wireless interface,—or using the third, wireline interface, the second, wireless interface, and the fourth, wireless interface via the mobile device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
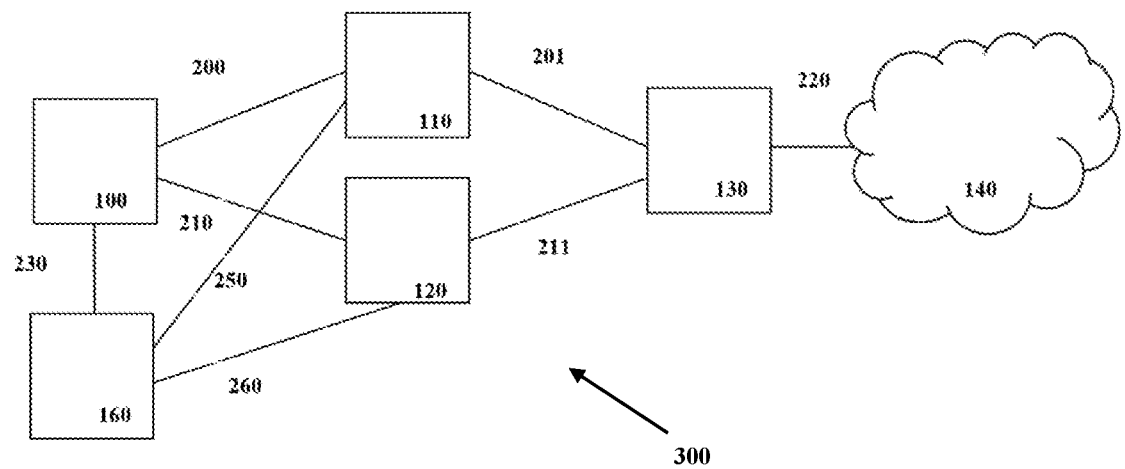
FIGS. 1a, 1b and 1c schematically illustrate different examples of a telecommunications network according to the present invention with a first router device and a second router device.

Exemplary embodiments of the present invention provide a method for dynamic load balancing using different data transmission paths in a telecommunications network comprising a mobile network part and a fixed network part, as well as a system and a router device for dynamic load balancing using different data transmission paths in a telecommunications network comprising a mobile network part and a fixed network part, such that the available data transmission bandwidths can be used more efficiently and more reliably, and this in an easy and flexible manner.

In an exemplary embodiment, the present invention provides a method for dynamic load balancing using different data transmission paths in a telecommunications network comprising a mobile network part and a fixed network part, and comprising at least one mobile device, wherein the telecommunications network comprises a plurality of router devices, the plurality of router devices comprising at least a first router device and a second router device, wherein the first router device comprises at least a first, wireline, interface with the fixed network part and at least a second, wireless, interface, wherein the second router device comprises at least a third, wireline, interface with the fixed network part and at least one wireless interface, wherein the first router device and the second router device are able to be connected using the second, wireless, interface as well as the at least one wireless interface of the second router device, wherein the at least one wireless interface of the second router device corresponds either to the second, wireless, interface—constituting an alternative data transmission path compared to the first router device using the first, wireline, interface as data transmission path with the fixed network part— or to a fourth, wireless, interface, the fourth, wireless, interface connecting the first and second router devices via corresponding wireless interfaces of the mobile device—and likewise constituting an alternative data transmission path compared to the first router device using the first, wireline, interface as data transmission path with the fixed network part—, wherein the method comprises the following steps:

in a first step, communication data are exchanged or transmitted between the fixed network part and the first router device using the first, wireline, interface as the data transmission path, in a second step, further communication data are exchanged or transmitted using the alternative data transmission path, either in addition to using the data transmission path or instead of using the data transmission path, between the fixed network part and the first router device—via the second router device—using either the third, wireline, interface and the second, wireless, interface, or using the third, wireline, interface, the second, wireless, interface, and the fourth, wireless, interface via the mobile device.

According to the present invention, it is advantageously possible that a device connected to the first router device (especially a device locally connected to the first router device) is able to use the data transmission bandwidth available through using the alternative data transmission path—either as an alternative to using the (normal) data transmission path or in addition (i.e. cumulatively) to using the (normal) data transmission path. This means that especially in cases where the wireline interface (of the first router device, i.e. using the (normal) data transmission path) is not able to provide sufficient data transmission bandwidth (especially when compared with a current data transmission bandwidth demand, especially a peak in bandwidth demand, of the router device and/or of further (especially household) devices or mobile devices—such as, e.g., mobile phones, smart phones, tablet devices, media servers or media hubs, streaming devices, television sets or other display devices—connected to the first router device) or in cases where the wireline interface (of the first router device, i.e. using the (normal) data transmission path) fails to provide usable data transmission bandwidth to the router device and/or to devices or mobile devices connected to the router, additional data transmission bandwidth can be used, and hence the available data transmission bandwidths can be used more efficiently and more reliably in an easy and flexible manner.

According to the present invention, it is assumed that the telecommunications network comprises a mobile network part and a fixed network part, at least one mobile device and (of a plurality of router devices) at least a first router device and a second router device. The first router device comprises at least a first, wireline, interface with the fixed network part and at least a second, wireless, interface. The second router device comprises at least a third, wireline, interface with the fixed network part and at least one wireless interface, wherein the first router device and the second router device are able to be connected using the second, wireless, interface (of the first router device) as well as using the at least one wireless interface of the second router device.

According to a first scenario (or alternative) according to the present invention, both the first router device and the second router device are—especially independently from each other—connected to the fixed network part of the telecommunications network (the first router device using the first, wireline, interface and the second router device using the third, wireline, interface, respectively), and additionally the first and second router devices are connected to each other using the second, wireless, interface of the first router device (and of the second router device; the at least one wireless interface of the second router device corresponding to the second, wireless, interface, i.e. both router devices are wirelessly connected (especially directly) with each other using the second, wireless, interface). In the first scenario, a device connected (especially locally) to the first router device is able to use the data transmission bandwidth provided by the alternative data transmission path between the fixed network part of the telecommunications network on the one hand, via the second router device and the second, wireless, interface between both router devices, and the first router device on the other hand (instead of or in addition to the (normal) data transmission path between the first router device and the fixed network part of the telecommunications network). Of course, this could also mean (but need not necessarily be realized) that a further device, connected (especially locally) to the second router device, is able to use the data transmission bandwidth provided by the alternative data transmission path between the fixed network part of the telecommunications network on the one hand, via the first router device and the second, wireless, interface between both router devices, and the second router device on the other hand (instead of or in addition to the (normal) data transmission path between the second router device and the fixed network part of the telecommunications network).

According to a second scenario (or alternative) according to the present invention, both the first router device and the second router device are—especially independently from each other—connected to the fixed network part of the telecommunications network (the first router device using the first, wireline, interface and the second router device using the third, wireline, interface, respectively), and additionally the first and second router devices are connected to each other via a mobile device (and, hence, using the corresponding wireless interfaces of the mobile device), the first router device using the second, wireless, interface, and the second router device using a fourth, wireless, interface (i.e. the at least one wireless interface of the second router device corresponds, in this second scenario, to the fourth, wireless, interface, i.e. both router devices are wirelessly connected (via the mobile device) with each other using the second, wireless, interface and the fourth, wireless interface). Likewise in the second scenario, a device (typically different to the mobile device connecting the first and second router device using the second, wireless, interface and the fourth, wireless, interface) connected (especially locally) to the first router device is able to use the data transmission bandwidth provided by the alternative data transmission path between the fixed network part of the telecommunications network on the one hand, via the second router device and the second and fourth, wireless, interfaces of the router devices, and the first router device on the other hand (instead of or in addition to the (normal) data transmission path between the first router device and the fixed network part of the telecommunications network). Of course, this could also mean (but need not necessarily be realized) that a further device, connected (especially locally) to the second router device, is able to use the data transmission bandwidth provided by the alternative data transmission path between the fixed network part of the telecommunications network on the one hand, via the first router device and the second and fourth, wireless, interfaces of the first and second router devices, and the second router device on the other hand (instead of or in addition to the (normal) data transmission path between the second router device and the fixed network part of the telecommunications network).

According to both the first and the second scenarios according to the present invention, an exemplary embodiment of the inventive method comprises the steps of using— in a first step—the (normal) data transmission path (i.e. communication data are exchanged or transmitted between the fixed network part and the first router device using the first, wireline, interface as the (normal) data transmission path) and of using—in a second step—the alternative data transmission path (i.e. further communication data are exchanged or transmitted using the alternative data transmission path, either in addition to using the data transmission path or instead of using the data transmission path, between the fixed network part and the first router device— via the second router device—using either the third, wireline, interface and the second, wireless, interface (first scenario) or using the third, wireline, interface, the second, wireless, interface, and the fourth, wireless, interface via the mobile device between the first router device and the second router device (second scenario).

According to further embodiments of the present invention, the first router device is a hybrid access router device and comprises a fifth, wireless, interface with the mobile network part and/or wherein the second router device is a hybrid access router device and comprises a sixth, wireless, interface with the mobile network part, wherein in the first step, communication data are exchanged between, on the one hand, the fixed network part and/or the mobile network part, and, on the other hand, the first router device using the first, wireline, interface and/or the fifth, wireless, interface as the data transmission path, and
wherein in the second step, further communication data are exchanged using the alternative data transmission path, either in addition to using the data transmission path or instead of using the data transmission path, between the fixed and/or mobile network parts and the first router device—via the second router device—using either the third, wireline, interface, the sixth, wireless, interface, and the second, wireless, interface, or using the third, wireline, interface, the sixth, wireless, interface, the second, wireless, interface, and the fourth, wireless, interface via the mobile device.

The first and/or second router device being a hybrid access router device (or hybrid access router devices) opens the possibility to a third and a fourth scenario according to the present invention:

According to the third scenario (or alternative) according to the present invention, both the first router device and the second router device are—especially independently from each other—connected to the fixed and/or mobile network part(s) of the telecommunications network (the first router device using the first, wireline, interface to be connected to the fixed network part and/or the fifth, wireless, interface to be connected to the mobile network part, and the second router device using the third, wireline, interface to be connected to the fixed network part and/or the sixth, wireless, interface to be connected to the mobile network part, respectively), and additionally the first and second router devices are connected to each other using the second, wireless, interface of the first router device (and of the second router device; the at least one wireless interface of the second router device corresponding to the second, wireless, interface, i.e. both router devices are wirelessly connected (especially directly) with each other using the second, wireless, interface). Likewise in the third scenario, a device connected (especially locally) to the first router device is able to use the data transmission bandwidth provided by the alternative data transmission path between the fixed and/or mobile network part(s) of the telecommunications network on the one hand, via the second router device and the second, wireless, interface between both router devices, and the first router device on the other hand (instead of or in addition to the (normal) data transmission path between the first router device and the fixed and/or mobile network part(s) of the telecommunications network, using the first, wireline, interface and/or the fifth, wireless, interface of the first router device). Of course, this could also mean (but need not necessarily be realized) that a further device, connected (especially locally) to the second router device, is able to use the data transmission bandwidth provided by an alternative data transmission path between the fixed and/or mobile network part(s) of the telecommunications network on the one hand, via the first router device and the second, wireless, interface between both router devices, and the second router device on the other hand (instead of or in addition to the (normal) data transmission path between the second router device and the fixed and/or mobile network part of the telecommunications network, using the third, wireline, interface and/or the sixth, wireless, interface of the second router device). Likewise according to the fourth scenario (or alternative) according to the present invention, both the first router device and the second router device are—especially independently from each other—connected to the fixed and/or mobile network part(s) of the telecommunications network (the first router device using the first, wireline, interface to be connected to the fixed network part and/or the fifth, wireless, interface to be connected to the mobile network part, and the second router device using the third, wireline, interface to be connected to the fixed network part and/or the sixth, wireless, interface to be connected to the mobile network part, respectively), and additionally the first and second router devices are connected to each other using the second, wireless, interface of the first router device (and of the second router device; the at least one wireless interface of the second router device corresponding to the second, wireless, interface, i.e. both router devices are wirelessly connected (especially directly) with each other using the second, wireless, interface). Likewise in the third scenario, a device connected (especially locally) to the first router device is able to use the data transmission bandwidth provided by the alternative data transmission path between the fixed and/or mobile network part(s) of the telecommunications network on the one hand, via the second router device and the second, wireless, interface between both router devices, and the first router device on the other hand (instead of or in addition to the (normal) data transmission path between the first router device and the fixed and/or mobile network part(s) of the telecommunications network, using the first, wireline, interface and/or the fifth, wireless, interface of the first router device). Of course, this could also mean (but need not necessarily be realized) that a further device, connected (especially locally) to the second router device, is able to use the data transmission bandwidth provided by an alternative data transmission path between the fixed and/or mobile network part(s) of the telecommunications network on the one hand, via the first router device and the second, wireless, interface between both router devices, and the second router device on the other hand (instead of or in addition to the (normal) data transmission path between the second router device and the fixed and/or mobile network part of the telecommunications network, using the third, wireline, interface and/or the sixth, wireless, interface of the second router device).

Likewise according to both the third and the fourth scenarios according to the present invention, an exemplary embodiment of the inventive method comprises the steps of using—in a first step—the (normal) data transmission path (i.e. communication data are exchanged or transmitted between the fixed network part and the first router device using the first, wireline, interface as the (normal) data transmission path) and of using—in a second step—the alternative data transmission path (i.e. further communication data are exchanged or transmitted using the alternative data transmission path, either in addition to using the data transmission path or instead of using the data transmission path, between the fixed network part and the first router device—via the second router device—using either the third, wireline, interface and the second, wireless, interface (third scenario) or using the third, wireline, interface, the second, wireless, interface, and the fourth, wireless, interface via the mobile device between the first router device and the second router device (fourth scenario).

According to a further embodiment of the present invention, the second, wireless, interface and/or the fourth, wireless, interface and/or the fifth, wireless, interface and/or the sixth, wireless, interface corresponds to at least one out of the following:
  a WLAN or Wi-Fi wireless interface,
  an LTE wireless interface,
  a Bluetooth wireless interface,
  an NFC (Near Field Communication) wireless interface.

Thereby, it is advantageously possible that an enhanced flexibility can be realized.

According to a further embodiment of the present invention, the telecommunications network comprises—besides the mobile device—a further mobile device, wherein the further communication data are exchanged using the alternative data transmission path between the fixed and/or mobile network parts and the first router device via the second router device, the mobile device and the further mobile device.

According to this embodiment, which is especially applicable to both the above mentioned second scenario or alternative as well as the above mentioned fourth scenario or alternative, it is advantageously possible that the first and second router devices communicate—using the alternative data transmission path—not only via the mobile device but via both the mobile device and the further mobile device. This means that it is advantageously possible that a wider distance between the first router device and the second router device is able to be covered, and hence, additional alternative data transmission paths rendered possible.

According to a further embodiment according to the present invention, the alternative data transmission path is established or used in case that the first router device requires a transmission bandwidth exceeding the transmission bandwidth available to the first router device using the (normal) data transmission path only.

By thereby using the alternative data transmission path in addition to the (normal) data transmission path, it is advantageously possible according to the present invention to provide—at least temporarily—a higher data transmission bandwidth to the first router device (or to devices (especially locally) connected to the first router device).

According to still a further embodiment of the present invention, the alternative data transmission path is established or used in case of a failure of the data transmission path.

By using the alternative data transmission path in case of a failure of the (normal) data transmission path (especially only in case of a failure of the (normal) data transmission path, i.e. the alternative data transmission path is not used in case that the (normal) data transmission path works at least almost correctly), it is advantageously possible according to the present invention that the telecommunications network can be rendered more reliable and failure scenarios (and especially failure times) can be enormously reduced. It is especially advantageous according to the present invention that—especially with respect to data privacy and/or data protection considerations—the alternative data transmission path is used only in case of a failure of the (normal) data transmission path.

The present invention also relates to a system for dynamic load balancing in a telecommunications network using different data transmission paths, wherein the telecommunications network comprises a mobile network part and a fixed network part, wherein the system comprises the telecommunications network and at least one mobile device, wherein the telecommunications network comprises a plurality of router devices, the plurality of router devices comprising at least a first router device and a second router device, wherein the first router device comprises at least a first, wireline, interface with the fixed network part and at least a second, wireless, interface, wherein the second router device comprises at least a third, wireline, interface with the fixed network part and at least one wireless interface, wherein the first router device and the second router device are able to be connected using the second, wireless, interface as well as the at least one wireless interface of the second router device, wherein the at least one wireless interface of the second router device corresponds
  either to the second, wireless, interface—constituting an alternative data transmission path compared to the first router device using the first, wireline, interface as data transmission path with the fixed network part— or to a fourth, wireless, interface, the fourth, wireless, interface connecting the first and second router devices via corresponding wireless interfaces of the mobile device—and likewise constituting an alternative data transmission path compared to the first router device using the first, wireline, interface as data transmission path with the fixed network part—, wherein the system is configured such that:

communication data are exchanged between the fixed network part and the first router device using the first, wireline, interface as the data transmission path, and further communication data are exchanged using the alternative data transmission path, either in addition to using the data transmission path or instead of using the data transmission path, between the fixed network part and the first router device—via the second router device—using either the third, wireline, interface and the second, wireless, interface, or using the third, wireline, interface, the second, wireless, interface, and the fourth, wireless, interface via the mobile device.

Thereby it is advantageously possible that a device connected to the first router device (especially a device locally connected to the first router device) is able to use the data transmission bandwidth available through using the alternative data transmission path—either as an alternative to using the (normal) data transmission path or in addition (i.e. cumulatively) to using the (normal) data transmission path.

According to an embodiment of the present invention, the first router device is a hybrid access router device and comprises a fifth, wireless, interface with the mobile network part and/or wherein the second router device is a hybrid access router device and comprises a sixth, wireless, interface with the mobile network part, wherein the system is configured such that communication data are exchanged between, on the one hand, the fixed network part and/or the mobile network part, and, on the other hand, the first router device using the first, wireline, interface and/or the fifth, wireless, interface as the data transmission path, and wherein the system is furthermore configured such that further communication data are exchanged using the alternative data transmission path, either in addition to using the data transmission path or instead of using the data transmission path, between the fixed and/or mobile network parts and the first router device—via the second router device—using either the third, wireline, interface, the sixth, wireless, interface, and the second, wireless, interface, or using the third, wireline, interface, the sixth, wireless, interface, the second, wireless, interface, and the fourth, wireless, interface via the mobile device.

According to a further embodiment according to the present invention, the second, wireless, interface and/or the fourth, wireless, interface and/or the fifth, wireless, interface and/or the sixth, wireless, interface corresponds to at least one out of the following:

a WLAN or Wi-Fi wireless interface, an LTE wireless interface, a Bluetooth wireless interface, an NFC (Near Field Communication) wireless interface.

Additionally, the present invention relates to a router device for dynamic load balancing in a telecommunications network using different data transmission paths, wherein the telecommunications network comprises a mobile network part and a fixed network part, and at least one mobile device, wherein the telecommunications network comprises, besides the router device as a first router device, a second router device, wherein the first router device comprises at least a first, wireline, interface with the fixed network part and at least a second, wireless, interface, wherein the second router device comprises at least a third, wireline, interface with the fixed network part and at least one wireless interface, wherein the first router device and the second router device are able to be connected using the second, wireless, interface as well as the at least one wireless interface of the second router device, wherein the at least one wireless interface of the second router device corresponds either to the second, wireless, interface—constituting an alternative data transmission path compared to the first router device using the first, wireline, interface as data transmission path with the fixed network part— or to a fourth, wireless, interface, the fourth, wireless, interface connecting the first and second router devices via corresponding wireless interfaces of the mobile device—and likewise constituting an alternative data transmission path compared to the first router device using the first, wireline, interface as data transmission path with the fixed network part—, wherein the router device is configured such that:

communication data are exchanged between the fixed network part and the first router device using the first, wireline, interface as the data transmission path, and further communication data are exchanged using the alternative data transmission path, either in addition to using the data transmission path or instead of using the data transmission path, between the fixed network part and the first router device—via the second router device—using either the third, wireline, interface and the second, wireless, interface, or using the third, wireline, interface, the second, wireless, interface, and the fourth, wireless, interface via the mobile device.

Thereby it is advantageously possible that a device connected to the first router device (especially a device locally connected to the first router device) is able to use the data transmission bandwidth available through using the alternative data transmission path—either as an alternative to using the (normal) data transmission path or in addition (i.e. cumulatively) to using the (normal) data transmission path.

According to an embodiment of the present invention, the first router device is a hybrid access router device and comprises a fifth, wireless, interface with the mobile network part and/or wherein the second router device is a hybrid access router device and comprises a sixth, wireless, interface with the mobile network part, wherein the router device is configured such that communication data are exchanged between, on the one hand, the fixed network part and/or the mobile network part, and, on the other hand, the first router device using the first, wireline, interface and/or the fifth, wireless, interface as the data transmission path, and wherein the router device is configured such that further communication data are exchanged using the alternative data transmission path, either in addition to using the data transmission path or instead of using the data transmission path, between the fixed and/or mobile network parts and the first router device—via the second router device—using either the third, wireline, interface, the sixth, wireless, interface, and the second, wireless, interface, or using the third, wireline, interface, the sixth, wireless, interface, the second, wireless, interface, and the fourth, wireless, interface via the mobile device.

Furthermore, the present invention relates to a program comprising a computer readable program code which, when executed on a computer or on a first router device or on a second router device or on a mobile device, or in part on the first router device and/or in part on the second router device and/or in part on the mobile device causes the computer or the first router device or the second router device or on a mobile device to perform an exemplary embodiment of the inventive method.

The present invention also relates to a computer program product for dynamic load balancing using different data transmission paths in a telecommunications network comprising a mobile network part and a fixed network part, the computer program product comprising a computer program stored on a storage medium, the computer program comprising program code which, when executed on a computer or on a first router device or on a second router device or on a mobile device, or in part on the first router device and/or in part on the second router device and/or in part on the mobile device causes the computer or the first router device or the second router device or on a mobile device to perform an exemplary embodiment of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1B:
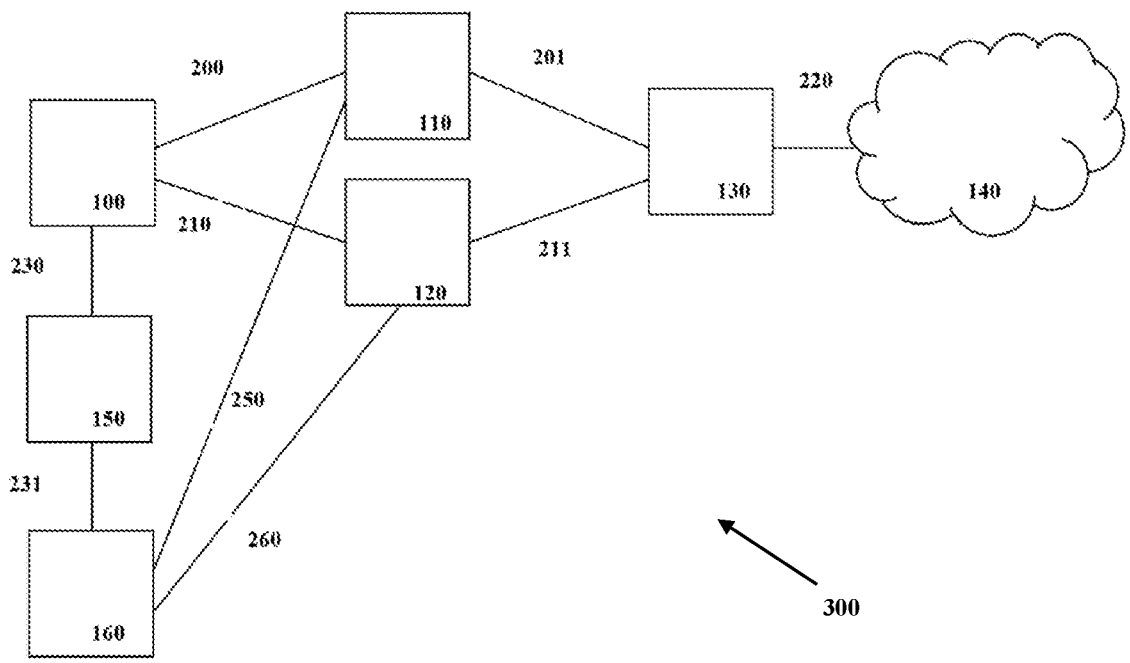
Figure 1C:
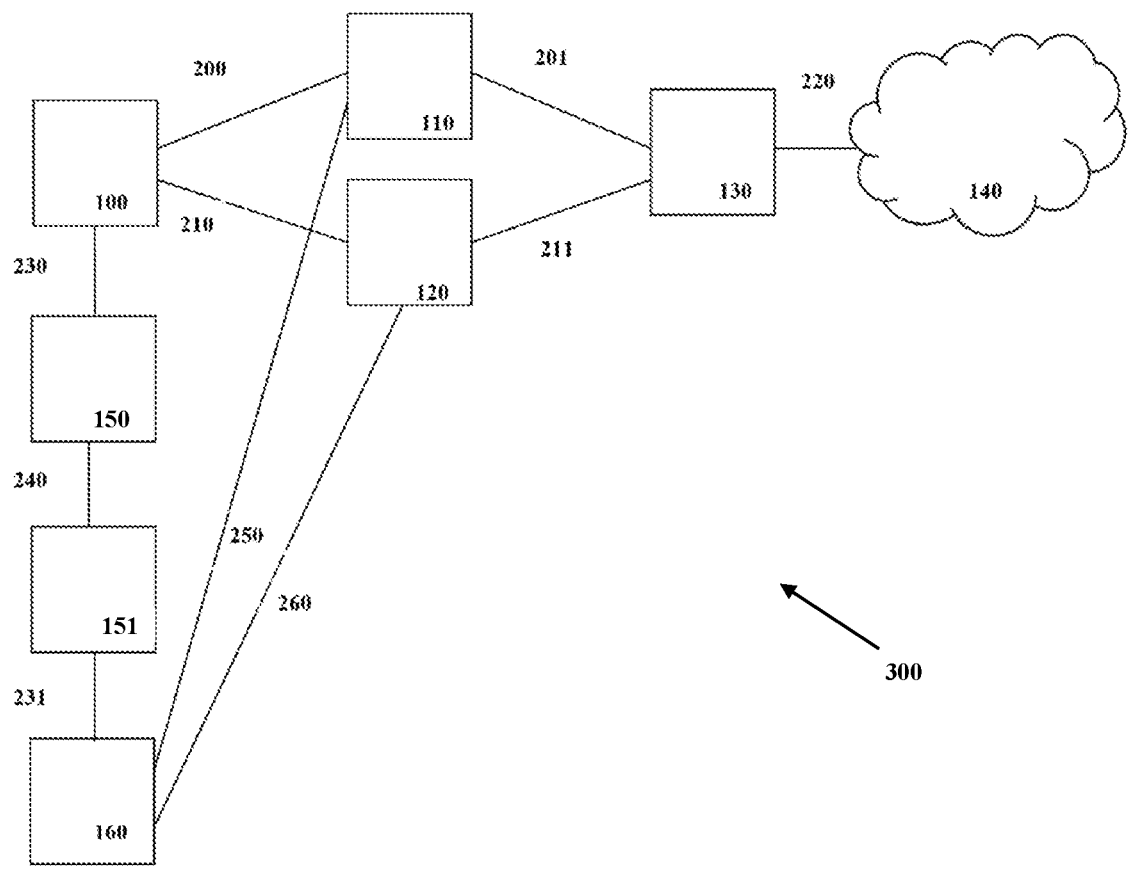

In all FIGS. 1a, 1b, and 1c, a telecommunications network 300 according to the present invention, comprising a mobile network part 110 and a fixed network part 120, is schematically shown. In the exemplary embodiment shown in FIGS. 1a, 1b, and 1c, the telecommunications network 300 comprises a hybrid access aggregation point (HAAP) 130 as well as an internet access 140 (the hybrid access aggregation point 130 being connected to the internet access 140 via a communication link 220. Typically, a load balancing is provided (with respect to the first router device 100) between a mobile network traffic route 200, 201 (i.e. the connection between the first router device 100 and the hybrid access aggregation point 130 via the mobile network part 110), and a fixed network route 210, 211 (i.e. the connection between the first router device 100 and the hybrid access aggregation point 130 via the fixed network part 120). The connection 210 between the first router device 100 and the fixed network part 120 corresponds to a first, wireline, interface. Likewise, a load balancing is provided (with respect to the second router device 160) between a further mobile network traffic route 250, 201 (i.e. the connection between the second router device 160 and the hybrid access aggregation point 130 via the mobile network part 110), and a further fixed network route 260, 211 (i.e. the connection between the second router device 160 and the hybrid access aggregation point 130 via the fixed network part 120).

According to the present invention, load sharing is enabled within the telecommunications network 300. In the embodiment exemplarily shown, load balancing or bonding within a telecommunications network 300 comprising a hybrid access managed system is shown by an additional direct connection between different router devices 100, 160 (especially HA (Hybrid Access)-Routers) or indirectly via communication through one or more mobile devices (e.g. using device-to-device (D2D) communication), which is shown in FIGS. 1b and 1c.

If—at, e.g., the first router device 100—the connection to a fixed or mobile network (i.e. the mobile network part 110 and/or to the fixed network part 120 of the telecommunications network 300) fails at one hybrid access router, traffic can be diverted through one mobile device 150 (cf. FIG. 1b) or more mobile devices 150, 151 (cf. FIG. 1c) which are capable and reachable, to another router device (especially a hybrid access (HA) router), i.e. the second router device 160, which has still connection to a fixed or mobile network (or fixed or mobile network part 120, 110), or the HA-routers (i.e. the first and second router devices 100, 160) communicate directly with each other (cf. FIG. 1a). Thereby, it is advantageously possible according to the present invention to provide an optimal traffic routing (using either a (normal) data transmission path or (instead or additionally) an alternative data transmission path) in case of a non-existing network connection or in case of a failed network connection (to either or both of the fixed network part 120 and/or the mobile network part 110) at one or more of the router devices 100, 160 (especially HA-Routers) to one or more hybrid access aggregation points (HAAP). Hence, the main aim of this invention is to additionally connect the HA-Routers (first and second router devices 100, 160) directly or indirectly via one or more mobile devices 150, 151 to enhance load sharing or bonding mechanism within a hybrid access (HA) managed system. According to the present invention, this can be realized by an additional connection 230 directly between the router devices 100, 160 (especially HA-routers), or by an indirect connection 230, 231 between the router devices 100, 160 (especially HA-routers) using one mobile device 150 or a plurality of mobile devices 151.

In the exemplary embodiment of FIG. 1a, the first router device 100 is directly connected to the second router device 160 using the additional connection 230 between both routers (i.e. using the second, wireless, interface of the first router device 100, and the at least one wireless interface of the second router device 160). In case that at least one of the first and second router devices 100, 160 is not a hybrid access router but is provides with a WLAN or Wi-Fi interface, the additional connection 230 can be realized as a WLAN connection between the first and second router devices 100, 160.

In case of, e.g., the LTE connection 200 from the first router device (e.g. a HA-Router) 100 to the mobile network part (or mobile network) 110 fails or is not existent, the first router device 100 tries (via a request) to connect to, e.g., the next reachable and available HA-Router, such as the second router device 160, via e.g. WLAN, LTE (D2D), Bluetooth, NFC, etc., i.e. via the additional connection 230. If the response of the second router device (or HA-Router) 160 is such that the additional connection 230 can be established for traffic offload, the mobile network traffic (e.g. LTE) for the first router device 100 is offload via the second router device 100; the additional connection 230 will remain established until a further request to release or other defined levels are reached (e.g. too less transfer speed, high packet drop rate, etc.). In case of, e.g., the DSL connection 210 from the first router device (e.g. a HA-Router) 100 to the fixed network part (or fixed network) 120 fails or is not existing, the first router device 100 tries via request to connect e.g. to the next reachable and available second router device 160 via e.g. WLAN, LTE (D2D), Bluetooth, NFC, etc., i.e. via the additional connection 230. If the response of the second router device 160 is such that the additional connection 230 can be established for traffic offload, in this case the fixed network traffic (e.g. DSL (digital subscriber line)) for the first router device 100 is offload via the second router device 160. The connection will remain until a further request to release or other defined levels are reached (e.g. too less transfer speed, high packet drop rate, etc.). In case that the direct communication between the first router device 100 and the second router device 160 is not possible, one mobile device 150 or more mobile devices, i.e. the mobile device and the further mobile device 150, 151 can be used to establish the connection between the router devices.

In the exemplary embodiment of FIG. 1b, the first and second router device 100, 160 are indirectly connected with each other using the additional connection 230 between the first router device 100 and a mobile device 150, and using a further additional connection 231 between the mobile device 150 and the second router device 160. Between the first router device 100 and the mobile device 150, the second, wireless, interface (of the first router device 100) is used, and between the mobile device 150 and the second router device 160, the fourth, wireless, interfaces (of the second router device 160) is used. By using the mobile device 150, i.e. especially one mobile device 150, that is capable and ready to act as a hub, as shown in FIG. 1b, the mobile device 150 is first requested via e.g. WLAN, LTE (D2D), Bluetooth, NFC, etc., i.e. using the additional connection 230 by the first router device (especially a HA-router) 100 to request a connection to the second router device (especially a HA-router) 160 via e.g. WLAN, LTE (D2D), Bluetooth, NFC, etc., using the further additional connection 231. If the router response of the second router device 160 (to the mobile device 150) is such that the connection is possible (or is refused), the mobile device 150 transmits this information to the first router device 100. In case that a connection through the mobile device 150 (i.e. using the additional connection and the further additional connection 230, 231) is possible, the connection for traffic offload (depends on case for mobile network or fixed network traffic) will be established. The connection will stay until a further request to release or other defined levels are reached (e.g. too less transfer speed, high packet drop rate, etc.).

In the exemplary embodiment of FIG. 1c, the first and second router device 100, 160 are indirectly connected with each other using the additional connection 230 between the first router device 100 and the mobile device 150, and using a further additional connection 231 between a further mobile device 151 and the second router device 160, and by using a wireless connection 240 (especially a device-to-device connection) between the mobile device 150 and the further mobile device 151. Between the first router device 100 and the mobile device 150, the second, wireless, interface (of the first router device 100) is used, and between the further mobile device 151 and the second router device 160, the fourth, wireless, interfaces (of the second router device 160) is used. By using two or more mobile devices 150,151 which are capable and ready to act as hubs, as shown in FIG. 1c, the mobile device 150 is first requested via e.g. WLAN, LTE (D2D), Bluetooth, NFC, etc. (additional connection 230) by the first router device 100 to request connection to the second router device 160. The mobile device 150 sends via e.g. WLAN, LTE (D2D), Bluetooth, NFC, etc. (i.e. using the wireless connection 240) the response to mobile device 151, which forwards it via e.g. WLAN, LTE (D2D), Bluetooth, NFC, etc. (i.e. the further additional connection 231) to the second router device 160. If the router response of the second router device 160 (to the further mobile device 151) is such that the connection is possible (or is refused), the further mobile device 151 transmits this information to the mobile device 150, and the mobile device transmits this information to the first router device 100. In case that a connection through the mobile devices 150, 151 (i.e. using the additional connection and the further additional connection 230, 231, as well as the wireless connection 240) is possible, the connection for traffic offload (depends on case for mobile network or fixed network traffic) will be established. The connection will stay until a further request to release or other defined levels are reached (e.g. too less transfer speed, high packet drop rate, etc.). In this respect, the routing between the router devices 100, 160, through using two or more mobile devices 150, 151 can be in principle managed in a serial or parallel way or in a combination of both.

A further possibility could be that also with a proper existing fixed and mobile network connection at two or more HA-router additionally traffic offloading could take place, using the direct and indirect connection between HA-router take place, which could bring some advantages especially if using several different fixed or mobile network accesses (especially regarding the possibility to offload traffic between different networks or operators (such as DSL-DSL or LTE-LTE)

With regard to successor technologies to LTE, also known as 5G, the functionalities of each component described in the scenarios above can transferred into network slices, which would allow even more flexibility. Thereby, it is possible to use the functionality also in 5G, even if not completely standardized.

Exemplary embodiments of the present invention include initializing the extended dynamic load balancing, the process of which is described in the following:

The initialization starts with a first initialization processing step; it is assumed that the LTE or DSL connection between the first router device 100 and the telecommunications network 300 works correctly; the processing flow continues to a second initialization processing step. In the second initialization processing step, it is checked whether the LTE or DSL connection of the first router device 100 fails or does not exist; if this is not the case, the processing flow branches to a third initialization processing step; if this is the case, the processing flow branches to a fourth initialization processing step. In the third initialization processing step, it is checked whether additional traffic offload is requested; if this is the case, the processing flow branches to the fourth initialization processing step, otherwise, the processing flow branches to an eleventh initialization processing step. In the fourth initialization processing step, it is checked whether a direct communication is possible to the second router device 160; if this is the case, the processing flow branches to a fifth initialization processing step, otherwise, the processing flow branches to a sixth initialization processing step. In the fifth initialization processing step, it is checked whether an indirect communication is possible to the second router device 160; if this is the case, the processing flow branches to a seventh initialization processing step; otherwise, the processing flow branches to the eleventh initialization processing step. In the sixth initialization processing step, a direct communication between the first and second router device 100, 160 is established. In the seventh initialization processing step, it is checked whether a mobile device 150 (or one mobile device 150) is available; if this is the case, the processing flow branches to a ninth initialization processing step, otherwise, the processing flow branches to an eighth initialization processing step. In the ninth initialization processing step, an indirect communication between the first and second router device 100, 160, via the mobile device 150, is established. In the eighth initialization processing step, it is established that two or more mobile devices are available, and the processing flow branches to a tenth initialization processing step. In the tenth initialization processing step, an indirect communication between the first and second router device 100, 160, via two or more mobile devices, is established. The eleventh initialization processing step corresponds to the end of the initialization process.

Exemplary embodiments of the present invention include performing the following processing steps with regard to a direct router communication:
The direct router communication (between the router devices 100, 160) starts with a first processing step, during which the first router device 100 sends a request to the second router device 160, and the processing flow continues to a second processing step. During the second processing step, it is checked whether the response of the second router devices 160 is ok; if this is the case, the processing flow branches to a third processing step; otherwise, the processing flow branches to a fourth processing step. In the fourth processing step, the connection is refused. In the fifth processing step, it is checked whether the connection is (still) established; if this is the case, the processing flow branches to a sixth processing step; otherwise, the processing flow branches to the third processing step. In the sixth processing step, traffic offload is performed for mobile and/or fixed network traffic; and the processing flow is continued to a seventh processing step. In the seventh processing step, it is checked whether a release request with regard to the connection exists; if this is the case, the processing flow branches to a ninth processing step; otherwise, the processing flow branches to an eighth processing step. In the eighth processing step, it is checked, whether defined criteria for a release of the connection is or are reached; if this is the case, the processing flow branches to the ninth processing step; if not, the processing flow branches to the seventh processing step. In the ninth processing step, the connection is released, and the processing flow branches to a tenth processing step, corresponding to performing the initialization process.

Exemplary embodiments of the present invention include performing the following processing steps with regard to an indirect router communication involving one mobile device:
The indirect router communication (between the router devices 100, 160 via one mobile device 150) starts with a first processing step, during which the first router device 100 connects to the mobile device 150, and the processing flow continues to a second processing step. During the second processing step, the second router device 160 connects to the mobile device 150, and the processing flow continues to a third processing step. During the third processing step, it is checked whether the connection to the mobile device 150 is established; if this is the case, the processing flow branches to a fifth processing step; otherwise, the processing flow branches to the first processing step. During the fifth processing step, the first router device 100 sends a request to the second router device 160, and the processing flow continues to a sixth processing step. During the sixth processing step, it is checked, whether the response of the second router device 160 corresponds to "connection ok"; if this is the case, the processing flow branches to an eighth processing step, otherwise, the processing flow branches to a seventh processing step. In the seventh processing step, the connection is refused. In the eighth processing step, the connection is established, and the processing flow continues to a ninth processing step. In the ninth processing step, it is checked whether the connection is established; if this is the case, the processing flow branches to a tenth processing step; otherwise, the processing flow branches to the eighth processing step. In the tenth processing step, traffic is offload for mobile and/or fixed network traffic, and the processing flow is continued to an eleventh processing step. In the eleventh processing step, it is checked whether a release request with regard to the connection exists; if this is the case, the processing flow branches to a thirteenth processing step; otherwise, the processing flow branches to a twelfth processing step. In the twelfth processing step, it is checked, whether defined criteria for a release of the connection is or are reached; if this is the case, the processing flow branches to the eleventh processing step; if not, the processing flow branches to the thirteenth processing step. In the thirteenth processing step, the connection is released, and the processing flow branches to a fourteenth processing step, corresponding to performing the initialization process.

Exemplary embodiments of the present invention include performing the following processing steps with regard to an indirect router communication involving two mobile devices:
The indirect router communication (between the router devices 100, 160 via two mobile devices 150, 151) starts with a first processing step, during which the first router device 100 connects to the mobile device 150, and the processing flow continues to a second processing step. During the second processing step, the second router device 160 connects to the further mobile device 151, and the processing flow continues to a third processing step. During the third processing step, it is checked whether a connection to the mobile devices 150, 151 exists; if this is the case, the processing flow branches to a fourth processing step; otherwise, the processing flow branches to the first processing step. In the fourth processing step, it is checked whether the connection between the mobile devices 150, 151 is established; if this is the case, the processing flow branches to a fifth processing step; otherwise, the processing flow branches to the first processing step. During the fifth processing step, the first router device 100 sends a request to the second router device 160, and the processing flow continues to a sixth processing step. During the sixth processing step, it is checked, whether the response of the second router device 160 corresponds to "connection ok"; if this is the case, the processing flow branches to an eighth processing step, otherwise, the processing flow branches to a seventh processing step. In the seventh processing step, the connection is refused. In the eighth processing step, the connection is established, and the processing flow continues to a ninth processing step. In the ninth processing step, it is checked whether the connection is established; if this is the case, the processing flow branches to a tenth processing step; otherwise, the processing flow branches to the eighth processing step. In the tenth processing step, traffic is offload for mobile and/or fixed network traffic, and the processing flow is continued to an eleventh processing step. In the eleventh processing step, it is checked whether a release request with regard to the connection exists; if this is the case, the processing flow branches to a thirteenth processing step; otherwise, the processing flow branches to a twelfth processing step. In the twelfth processing step, it is checked, whether defined criteria for a release of the connection is or are reached; if this is the case, the processing flow branches to the eleventh processing step; if not, the processing flow branches to the thirteenth processing step. In the thirteenth processing step, the connection is released, and the processing flow branches to a fourteenth processing step, corresponding to performing the initialization process.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for dynamic load balancing using different data transmission paths in a telecommunications network comprising a mobile network part and a fixed network part, and comprising at least one mobile device, wherein the method comprises:
   exchanging communication data using a first data transmission path between the fixed network part of the telecommunications network and a first router device of the telecommunications network via a wired connection between a wireline interface of the first router device and the fixed network part of the telecommunications network;
   determining that the first router device requires a transmission bandwidth exceeding a transmission bandwidth of the first data transmission path with respect to communications between the fixed network part of the telecommunications network and the first router device; and
   in response to determining that the first router device requires a transmission bandwidth exceeding a transmission bandwidth of the first data transmission path, exchanging further communication data using a second data transmission path, in addition to exchanging the communication data using the first data transmission path, between the fixed network part of the telecommunications network and the first router device, wherein the first and second data transmission paths are simultaneously used for transmitting the communication data and the further communication data such that the first and second data transmission paths cumulatively provide more transmission bandwidth with respect to communications between the fixed network part of the telecommunications network and the first router device than the transmission bandwidth of the first data transmission path, and wherein exchanging the further communication data using the second data transmission path comprises:
      exchanging the further communication data between the second router device and the fixed network part of the telecommunications network via a wired connection between a wireline interface of the second router device and the fixed network part of the telecommunications network; and
      wirelessly exchanging the further communication data between the second router device and the first router device via a wireless connection between a wireless interface of the first router device and a wireless interface of the second router device, wherein the wireless connection between the wireless interface of the first router device and the wireless interface of the second router device traverses one or more mobile devices using device-to-device (D2D) communication.

2. The method according to claim 1, wherein the first router device is a hybrid access router device and comprises a further wireless interface with the mobile network part of the telecommunications network and/or wherein the second router device is a hybrid access router device and comprises a further wireless interface with the mobile network part of the telecommunications network;
   wherein the method further comprises:
      exchanging communication data between the mobile network part of the telecommunications network and the first router device via a third data communication path, wherein the third data communication path comprises the further wireless interface of the first router device; and/or
      exchanging communication data between the mobile network part of the telecommunications network and the first router device via a fourth data communication path, wherein the fourth data communication path comprises the further wireless interface of the second router device.

3. The method according to claim 1, wherein the wireless interface of the first router device and/or the wireless interface of the second router device corresponds to at least one out of the following:
   a wireless local area network (WLAN) or Wi-Fi wireless interface,
   a Long-Term Evolution (LTE) wireless interface,
   a Bluetooth wireless interface,
   a Near Field Communication NFC wireless interface.

4. A system for dynamic load balancing in a telecommunications network using different data transmission paths, wherein the system comprises:
   the telecommunications network, wherein the telecommunications network comprises a mobile network part and a fixed network part; and
   at least one mobile device;
   wherein the telecommunications network further comprises a plurality of router devices, the plurality of router devices comprising at least a first router device and a second router device, wherein the first router device comprises a wireline interface connected to the fixed network part and a wireless interface, wherein the second router device comprises a wireline interface connected to the fixed network part and a wireless interface, wherein the first router device and the second router device are able to be connected to each other using the wireless interface of the first router device and the wireless interface of the second router device;
   wherein the fixed network part of the telecommunications network and the first router device are configured to exchange communication data using a first data transmission path via a wired connection between the wireline interface of the first router device and the fixed network part of the telecommunications network; and
   wherein the fixed network part of the telecommunications network and the first router device are further configured to, in response to a determination that the first router device requires a transmission bandwidth exceeding a transmission bandwidth of the first data transmission path with respect to communications between the fixed network part of the telecommunications network and the first router device, exchange further communication data using a second data transmission path, in addition to exchanging the communication data using the first data transmission path, between the fixed network part of the telecommunications network and the first router device, wherein the first and second data transmission paths are simultaneously used for transmitting the communication data and the further communication data such that the first and second data transmission paths cumulatively provide more transmission bandwidth with respect to communications between the fixed network part of the telecommunications network and the first router device than the transmission bandwidth of the first data transmission path, wherein exchanging the further communication data using the second data transmission path comprises:
      exchanging the further communication data between the second router device and the fixed network part of the telecommunications network via a wired connection between a wireline interface of the second router device and the fixed network part of the telecommunications network; and
      wirelessly exchanging the further communication data between the second router device and the first router device via a wireless connection between a wireless interface of the first router device and a wireless interface of the second router device, wherein the wireless connection between the wireless interface of the first router device and the wireless interface of the second router device traverses one or more mobile devices using device-to-device (D2D) communication.

5. The system according to claim 4, wherein the first router device is a hybrid access router device and comprises a further wireless interface with the mobile network part of the telecommunications network and/or wherein the second router device is a hybrid access router device and comprises a further wireless interface with the mobile network part of the telecommunications network;
   wherein the mobile network part of the telecommunications network and the first router device are configured to exchange communication data via a third data communication path comprising the further wireless interface of the first router device and/or via a fourth data communication path comprising the further wireless interface of the second router device.

6. The system according to claim 4, wherein the wireless interface of the first router device and/or the wireless interface of the second router device corresponds to at least one out of the following:
   a wireless local area network (WLAN) or Wi-Fi wireless interface,
   a Long-Term Evolution (LTE) wireless interface,
   a Bluetooth wireless interface,
   a Near Field Communication NFC wireless interface.

7. A non-transitory, computer-readable medium having processor-executable instructions stored thereon for dynamic load balancing using different data transmission paths in a telecommunications network comprising a mobile network part and a fixed network part, and comprising at least one mobile device,
   wherein the processor-executable instructions, when executed, facilitate the following:
   exchanging communication data using a first data transmission path between the fixed network part of the telecommunications network and a first router device of the telecommunications network via a wired connection between a wireline interface of the first router device and the fixed network part of the telecommunications network;
   determining that the first router device requires a transmission bandwidth exceeding a transmission bandwidth of the first data transmission path with respect to communications between the fixed network part of the telecommunications network and the first router device; and
   in response to determining that the first router device requires a transmission bandwidth exceeding a transmission bandwidth of the first data transmission path, exchanging further communication data using a second data transmission path, in addition to exchanging the communication data using the first data transmission path, between the fixed network part of the telecommunications network and the first router device, wherein the first and second data transmission paths are simultaneously used for transmitting the communication data and the further communication data such that the first and second data transmission paths cumulatively provide more transmission bandwidth with respect to communications between the fixed network part of the telecommunications network and the first router device than the transmission bandwidth of the first data transmission path, wherein exchanging the further communication data using the second data transmission path comprises:
      exchanging the further communication data between the second router device and the fixed network part of the telecommunications network via a wired connection between a wireline interface of the second router device and the fixed network part of the telecommunications network; and wirelessly exchanging the further communication data between the second router device and the first router device via a wireless connection between a wireless interface of the first router device and a wireless interface of the second router device, wherein the wireless connection between the wireless interface of the first router device and the wireless interface of the second router device traverses one or more mobile devices using device-to-device (D2D) communication.

\* \* \* \* \*